E. M. STRATTON.
Axle-Box.

No. 14,579.

Patented Apr. 1, 1856

Witnesses.
E. W. Stratton
Daniel Barnum

Inventor.
Ezrah Stratton

UNITED STATES PATENT OFFICE.

EZRA M. STRATTON, OF NEW YORK, N. Y.

AXLE-BOX FOR CARRIAGES.

Specification of Letters Patent No. 14,579, dated April 1, 1856.

*To all whom it may concern:*

Be it known that I, EZRA M. STRATTON, of the city, county, and State of New York, have invented new and useful Improvements in Constructing, Fitting, and Fastening Mail-Axle Boxes in their Hubs by making plain longitudinal channels across the enlarged portion of such boxes, forming key-seats therein and combining therewith as keys the long bolts which pass through the hubs for fastening carriage-wheels upon mail-axles, by which means I group the long bolts compactly around the box, thus adapting mail-axle boxes and long bolts to the small hubs now required for light carriages; and I do hereby declare the foregoing and following to be a full and clear description of my said improvements, reference being had to the acompanying drawings and to the letters of reference marked thereon, the same letters referring to the same parts in both figures.

Figure 1:
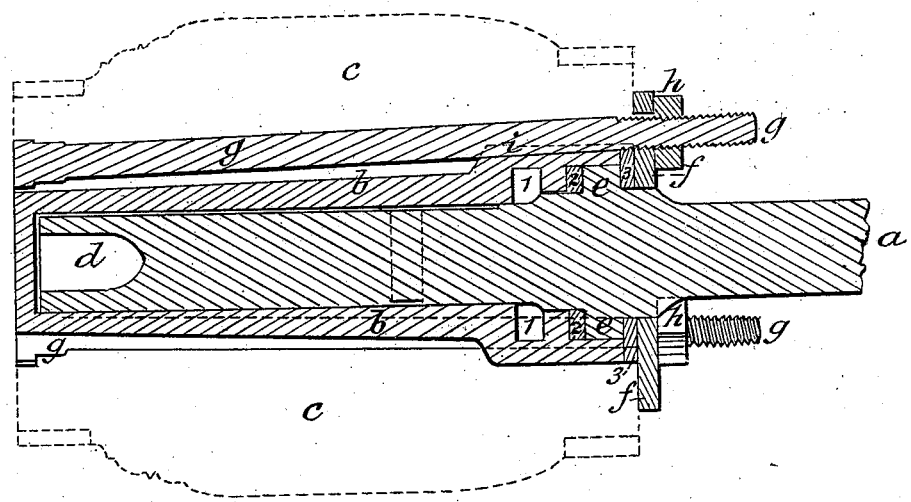
Figure 2:
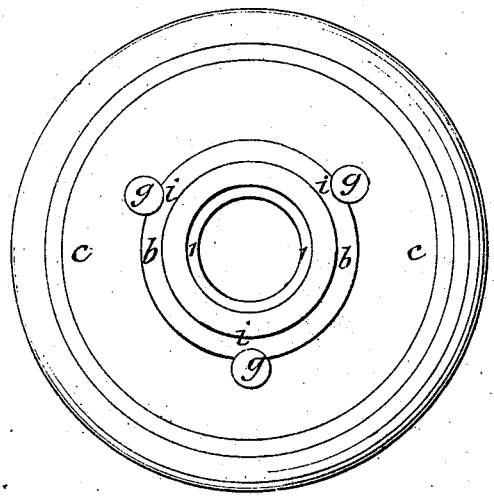

Figure 1 is a sectional elevation of a mail axle and box, fitted in a light carriage hub—full size—long bolts are shown as passing through the hub, with nuts against a flange for securing the hub and box upon the axle. Fig. 2, is an end view of the hub with the flange and axle removed showing the end of the box and the manner of constructing it, with plain longitudinal key seats, adapted to, and combined with, long bolts (as keys) which securely fasten the box in the hub without wedges, thus preserving the maximum strength of the material of which the hub is composed.

Mail axles and boxes for carriages have long been favorably known. The use of long bolts passing through the hub to a flange behind a collar on the axle for fastening carriage wheels upon mail axles has justly been regarded as safe, and secure. As heretofore used however, the long bolts have passed through the hub entirely outside of, and disconnected from, the box, and therefore the bolts passed through the spokes near the periphery of the hub, materially weakening both hubs and spokes, except when large hubs were used, hence mail axles with long bolts were unsuited to the small hubs for light carriages now in use. Various efforts have been made to secure the advantages of mail axles and boxes and to dispense with the use of long bolts, so as to preserve the requisite strength in the hub and spokes to adapt them to small hubs. For this purpose short bolts with heads adapted to, and fitted in grooves, or lugs, on the large end of mail axle boxes have been used, the declared object being to dispense with the long bolts, but all such efforts have failed.

The object of my invention is to group the long bolts close to the small portion of the mail axle box, and by thus making them compact, to pass them through the hub and spokes near the center, or at the roots of the spokes, and thereby preserving the maximum strength of the hub as well as spokes. I am thus enabled to overcome all the difficulties heretofore experienced in using small hubs with mail axles and boxes and at the same time to retain all the advantages due to their use with the most simple and safe means of fastening the wheels upon their axles—and the boxes in the hubs.

In order that others skilled in the arts may understand the nature of my invention, and to enable them to make and use the same, I refer to the accompanying drawings, and to the letters of reference marked thereon as showing the nature of my invention to consist in the construction of plain longitudinal channels ($i$) (forming key seats) for the long bolts ($g$) (as keys) which are shown in both figures, in combination, which construction and combination enables me to group the bolts ($g$) close to the box ($b$) and thus to make them compact and suited to small hubs, for light carriages. The interior arrangement of the box and of the axle, with the means for holding and retaining oil for lubrication and also of the flange for securing the wheel upon the axles, are such as are in common use. It will be understood therefore that ($d$) represents an oil cup in the end of the axle ($a$). (1,) also represents an oil recess in the box ($b$).

(2) and (3) are leather washers, one upon each side of the collar ($e$) upon the axle ($a$).

($f$) represents a flange through which the bolts ($g$) pass, which flange ($f$) is screwed firmly against the end of the hub ($c$) by the nuts ($h$). Fig. 1 being in section the longitudinal channel ($i$) with the long bolt ($g$) passing through it, is seen in dotted lines on the upper side of the box ($b$.)

In Fig. 2 is shown the number and position of the bolts ($g$) acting as keys in the channels ($i$), securely fastening the box ($b$)

in the hub (c) without wedges driven in the end of the hub, such wedges being the only means heretofore known for fastening axle boxes in carriage hubs. Fig. 2 also shows that the box (b) is fitted in the hub (c) simply by boring out the hub to the proper size, and also that the longitudinal channels (i) mark the place for the holes through the hub (c) for the bolts (g) and that they serve as guides for the bit in boring them, so that the labor as well as the cost of fitting is materially cheapened while at the same time all injury to the hub by cutting to fit, or splitting the wedge the box, as has been done heretofore in all cases in fastening axle boxes in carriage hubs, is entirely avoided, and the full strength of the hub is preserved.

Having thus fully described my invention, I do hereby declare that I do not claim the making lateral grooves in the large part of mail axle boxes in which to fit the heads of short bolts to supersede long bolts as described and claimed by Wm. H. Saunders. Nor do I claim long bolts passing through carriage hubs to fasten them upon mail axles the same being outside of and disconnected from the box as heretofore used—but

I do claim—

1. Plain longitudinal channels across the enlarged portion of mail axle boxes, adapted to and in combination with long bolts for fastening carriage wheels upon mail axles— by which combination the long bolts are brought close to the small portion of the box—and the whole so compactly grouped together as to adapt mail axles and boxes— and long bolts to small hubs—such as are now required for light and fashionable carriages—substantially as described and shown.

2. I claim also the combination of plain longitudinal channels made across the enlarged portion of mail axle boxes with reverse channels made in corresponding portions of the hub, when the box and hub are fitted for, and combined with the long bolts acting therein—as keys—between the box and hub, as seen in Fig. 2, for the purpose of securely fastening the box in the hub by means of the long bolts which thus perform the functions of keys—and dispense with the necessity for injuring the hub by splitting and wedging the same as has heretofore been necessary in all cases for fastening axle boxes in carriage hubs—whereby I preserve the full strength of the hub, and materially cheapen the cost and labor of fitting and fastening the box therein—substantially as described and shown.

EZRA M. STRATTON.

Witnesses:
E. M. STRATTON,
DANIEL BARNUM.